United States Patent [19]

Putscher et al.

[11] 3,750,542
[45] Aug. 7, 1973

[54] CONTAINER FOR PHOTOGRAPHIC FILM

[75] Inventors: Johann Putscher, Munich; Josef Gersch, Unterhaching; Otto Wiedemann, Starnberg; Alfred Winkler, Munich, all of Germany

[73] Assignee: AGFA-Gevaert AG, Leverkusen, Germany

[22] Filed: Dec. 9, 1971

[21] Appl. No.: 206,258

Related U.S. Application Data

[62] Division of Ser. No. 45,874, June 12, 1970, Pat. No. 3,665,829.

[30] Foreign Application Priority Data

June 19, 1969 Germany.................. P 19 31 117.2
Aug. 18, 1969 Germany.................. P 19 41 101.9

[52] U.S. Cl. ............................................. 95/31 CA
[51] Int. Cl. ............................................. G03b 17/28
[58] Field of Search ...................... 95/31 R, 31 CA

[56] References Cited

UNITED STATES PATENTS 3,490,350  1/1970  Hardies et al. ................... 95/31 CA
3,628,435  12/1971  Nerwin ............................. 95/31 CA Primary Examiner—Joseph F. Peters, Jr.
Attorney—Michael S. Striker

[57] ABSTRACT

A container for photographic film has a hollow web connecting a film-supplying chamber with a film-collecting chamber. The front wall of the web has a window which exposes one film frame at a time and such frame is held at a fixed distance from the picture-taking objective of the camera by locating surfaces provided on pins forming part of the rear wall of the web. The pins extend through openings of the front wall of the web and abut against a stop in the camera body.

10 Claims, 3 Drawing Figures

PATENTED AUG 7 1973 3,750,542

INVENTOR
JOHANN PUTSCHER
JOSEF GERSCH
OTTO WIEDEMANN
ALFRED WINKLE

BY

ATTORNEY

CONTAINER FOR PHOTOGRAPHIC FILM

This is a division of application Ser. No. 45,874 filed June 12, 1970 now U.S. Pat. No. 3,665,829.

BACKGROUND OF THE INVENTION

The present invention relates to improvements in containers or cassettes for photographic film. More particularly, the invention relates to improvements in containers of the type wherein the film is transported from a first chamber into a second chamber and through a hollow intermediate portion or web which is provided with a window for exposure of successive film frames to scene light.

Presently known containers of the just outlined character normally consist of synthetic plastic material and their parts are welded to each other. The intermediate portion includes a rear wall against which the film frame behind the window abuts and a front wall which is formed with the window and is welded to the rear wall. Such welding invariably causes at least some distortion of the container and thus affects the distance between the film frame behind the window and the objective of the photographic apparatus wherein the container is put to use.

SUMMARY OF THE INVENTION

One object of the invention is to provide a container or cassette for photographic roll film wherein the film frame which is to be exposed to scene light is invariably positioned at a predetermined distance from the picture-taking objective regardless of eventual inaccuracies in the manufacturing of the container.

A further object of the invention is to provide a container wherein deformation which normally develop in response to welding of the sections of the container shell to each other cannot influence the distance between the film frame to be exposed and the picture-taking objective when the container is properly installed in a photographic apparatus.

An additional object of the invention is to provide a container which exhibits the above-outlined novel features and is capable of being used in presently known cameras.

The invention resides in the provision of a container for photographic film which is to be used in photographic apparatus of the type having a body including a stop portion located at a predetermined distance from the picture-taking objective.

In accordance with the invention, the container comprises a film-supplying first portion, a film-collecting second portion, and a hollow intermediate portion which connects the first and second portions and defines a channel wherein the film can be transported stepwise from the first into the second portion. The intermediate portion comprises a front wall provided with a window which exposes one frame of the film in the channel and a rear wall having a front surface against which the film in the channel abuts. The front wall of the intermediate portion has a front surface which abuts against the stop portion in the body of the apparatus wherein the container is installed, and the rear wall has a plurality of projections extending through openings provided in the front wall and having locating surfaces coplanar with the front surface of the front wall and abutting against the stop portion.

The novel features which are considered as characteristic of the invention are set forth in particular in the appended claims. The improved container itself, however, both as to its construction and the mode of assembling and utilizing the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
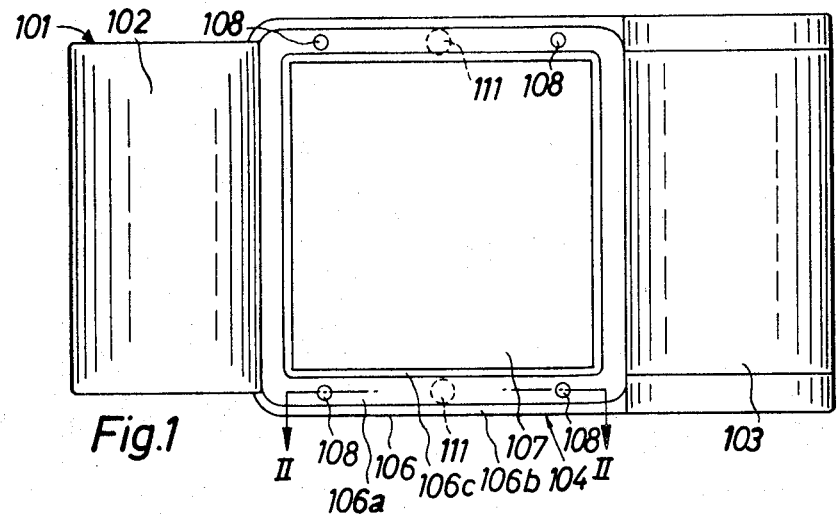
FIG. 1 is a plan view of a container.
Figure 2:
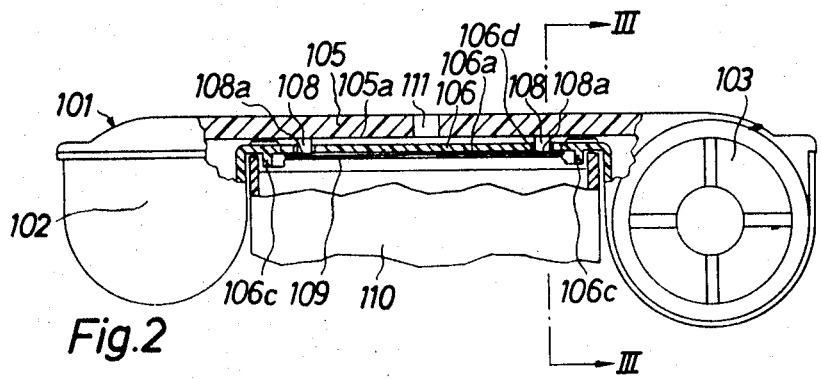
FIG. 2 is a partly elevational and partly sectional view of the container, the section being taken along the line II—II of FIG. 1.
Figure 3:
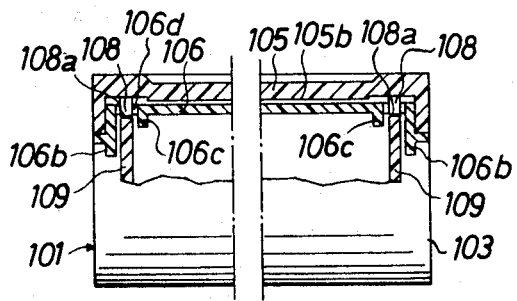
FIG. 3 is a sectional view as seen in the direction of arrows from the line III—III of FIG. 2.

Referring now to FIGS. 1–3, there is shown a container 101 which includes a film-supplying first portion or chamber 102, a film-collecting second portion or chamber 103, and a hollow intermediate portion or web 104 which connects the portions 102, 103 with each other and defines a narrow channel for photographic film. The intermediate portion 104 includes a rear wall 105 which is integral with parts of the chambers 102, 103, and a frame-like front wall 106 portions of which are also integral with the chambers 102, 103. The walls 105, 106 are welded to each other. The front wall 106 is formed with a window 107 and has a rectangular front surface 106a surrounding the entire window 107 and being in turn surrounded by forwardly extending frame members or ledges 106b, 106c of the front wall 106. The front surface 105a of the rear wall 105 has a portion 105b serving as an abutment for that film frame which is located behind the window 107. The surface 105a is provided with at least three, preferably four forwardly extending projections or pins 108 two of which are adjacent to one marginal portion and the other two of which are adjacent to the other material portion of the film frame behind the window 107. These pins 108 are adjacent to the surface portion 105b. The front wall 106 is formed with openings 106d which are provided in the surface 106a and permit passage of the pins 108. The locating surfaces or front surfaces 108a of the pins 108 abut against a stop portion 109 which forms part of the camera body 110 and is located at a predetermined distance from the picture-taking objective. Thus, the film frame which abuts against the surface portion 105b of the rear wall 105 is located at a fixed distance from the objective as soon as the container 101 is properly inserted into the body 110 so that the locating surfaces 108a of the pins 108 bear against the stop portion 109, provided that the distance between the surface portion 105b and the locating surfaces 108a is selected with a reasonable degree of precision. This presents no serious problems in the manufacture and assembly of the container 101.

It will be seen that the distance between the film frame behind the window 107 and the objective of the camera is determined exclusively by the rear wall 105 of the intermediate portion 104, i.e., by the pins 108 which are integral with and form part of the rear wall 105. The distance between such film frame and the objective is a function of the distance between the locating surfaces 108a and the surface portion 105b. Welding of the front wall 106 to the rear wall 105 does not unduly influence the distance between the surface portion 105b and the locating surfaces 108a.

The locating surfaces 108a are preferably coplanar with the front surface 106a of the front wall 106, i.e., the distance between the locating surfaces 108a and the surface portion 105b is the same as the distance between the surface 106a and the surface portion 105b. This is achieved by utilizing a welding machine having mandrels extending through at least two holes 111 provided therefor in the rear wall 105 and serving to bias the front surface 106a against an anvil which serves as a stop for the locating surfaces 108a during welding of the front wall 106 to the rear wall 105. The illustrated holes 111 are provided in the rear wall 105 behind the adjacent portions of the front surface 106a and each thereof is located between two pins 108. It will be seen that, during welding of the walls 105, 106 to each other, the surface 106a abuts against the same stop surface which serves as an abutment for the locating surfaces 108a on the pins 108 so that the surfaces 108a are invariably located in the plane of the surface 106a when the welding of the front wall 106 to the rear wall 105 is completed. Therefore, the stop portion 109 lies flush against the surfaces 106a and 108a when the container 101 is properly inserted into the camera body 110.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. For use in a photographic apparatus having a body including a stop portion located at a predetermined distance from the picture-taking objective, a container for photographic film comprising a film-supplying first portion; a film-collecting second portion; and a hollow intermediate portion connecting said first and second portions and defining a channel for photographic film, said intermediate portion having a rear wall having a front surface against which the film in said channel abuts and a front wall rigid with said rear wall and provided with a window exposing a portion of the film in said channel, said front wall having a front surface abutting against the stop portion in the body of the apparatus wherein the container is installed and said rear wall having a plurality of projections extending through openings provided in said front wall and having locating surfaces coplanar with the front surface of said front wall and abutting against said stop portion.

2. A container as defined in claim 1, wherein said rear wall is provided with holes which facilitate insertion of instrumentalities serving to maintain the front surface of said front wall in the plane of said locating surfaces during assembly of said container the course of which said front wall is bonded to said rear wall.

3. A container as defined in claim 2, wherein said holes are adjacent to the marginal portion of the film in said channel.

4. A container as defined in claim 1, wherein said projections are pins which form integral parts of said rear wall.

5. A container as defined in claim 1, wherein the front surface of said front wall surrounds the entire window.

6. A container as defined in claim 1, wherein said locating surfaces are round.

7. A container as defined in claim 1, wherein said projections form two rows flanking said channel.

8. A container as defined in claim 1, wherein at least said intermediate portion consists of synthetic plastic material.

9. A container as defined in claim 1, wherein said front surfaces are flat and parallel to each other.

10. A container as defined in claim 1, wherein said front wall of said intermediate portion has frame members extending forwardly of the front surface of said front wall and serving to restrict sidewise movements of the container with reference to the stop portion of the apparatus.

* * * * *